(12) United States Patent
Voigt

(10) Patent No.: US 10,538,686 B2
(45) Date of Patent: Jan. 21, 2020

(54) MULTI-MATERIAL ASSEMBLY AND METHODS OF MAKING THEREOF

(71) Applicant: Honda Motor Co., Ltd., Tokyo (JP)

(72) Inventor: Derik Thomas Voigt, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 48 days.

(21) Appl. No.: 15/716,694

(22) Filed: Sep. 27, 2017

(65) Prior Publication Data

US 2019/0092976 A1 Mar. 28, 2019

(51) Int. Cl.
*B62D 25/04* (2006.01)
*B62D 29/00* (2006.01)
*B29C 65/00* (2006.01)
*B29C 65/48* (2006.01)
*B29C 65/72* (2006.01)
(Continued)

(52) U.S. Cl.
CPC .............. *C09J 5/00* (2013.01); *B29C 65/483* (2013.01); *B29C 65/72* (2013.01); *B29C 66/02245* (2013.01); *B29C 66/0382* (2013.01); *F16B 11/006* (2013.01)

(58) Field of Classification Search
CPC ........ B62D 21/00; B62D 25/00; B62D 25/04; B62D 27/026; B62D 29/002; B62D 29/005; B62D 29/001; B29C 65/00; B29C 65/02; B29C 65/48; B29C 65/483; B29C 65/4835; B29C 65/72; B29C 66/00; B29C 66/02; B29C 66/0224; B29C 66/02245; B29C 66/0382; B29C 66/1122; F16B 11/006; B32B 2605/00; B32B 2605/08; B32B 37/1207

USPC .......... 156/60, 71, 73.5, 150, 151, 153, 155, 156/196, 212, 242, 244.11, 245, 272.2, 156/273.9, 278, 280, 290, 291, 292, 293, 156/296; 427/256, 259, 261, 264, 270, 427/271, 272, 282, 287, 331, 457;
(Continued)

(56) References Cited

U.S. PATENT DOCUMENTS 2,872,361 A 2/1959 Campbell et al.
3,382,159 A 5/1968 Reed
(Continued)

FOREIGN PATENT DOCUMENTS

CN 102766867 B 8/2014
JP 2007237262 A 9/2007
(Continued)

OTHER PUBLICATIONS

ArcelorMittal S.A., "Steels for hot stamping," May 11, 2012. (Year: 2012).*
(Continued)

*Primary Examiner* — Philip C Tucker
*Assistant Examiner* — Brian R Slawski
(74) *Attorney, Agent, or Firm* — Honda Patents & Technologies North America, LLC; William R. Fisher

(57) ABSTRACT

A multi-material assembly is provided, as well as methods of making a multi-material assembly. The multi-material assembly includes a first coated structural component and a second structural component. The first coated structural component includes a first uncoated portion, and an adhesive is positioned between the second structural component and the first uncoated portion that secures the first coated structural component to the second structural component.

9 Claims, 15 Drawing Sheets

(51) Int. Cl.
*B32B 37/00* (2006.01)
*F16B 11/00* (2006.01)
*C09J 5/00* (2006.01)

(58) Field of Classification Search
USPC .......... 148/518; 29/458; 296/187.01, 193.01, 296/193.06, 203.01
See application file for complete search history.

(56) References Cited

U.S. PATENT DOCUMENTS

| | | | |
|---|---|---|---|
| 3,556,874 | A | 1/1971 | McClain |
| 3,937,387 | A | 2/1976 | Fletcher et al. |
| 4,263,419 | A | 4/1981 | Piestert et al. |
| 4,861,407 | A | 8/1989 | Volkmann et al. |
| 6,036,995 | A | 3/2000 | Kircher et al. |
| 6,372,063 | B1 | 4/2002 | Grillon |
| 6,613,184 | B1 | 9/2003 | Egitto et al. |
| 6,911,249 | B2 | 6/2005 | Wagner et al. |
| 6,997,780 | B2 | 2/2006 | Pieper |
| 7,229,953 | B1 | 6/2007 | Agarwala et al. |
| 8,021,491 | B2 | 9/2011 | Kool et al. |
| 8,262,870 | B2 | 9/2012 | Fairbourn et al. |
| 8,377,324 | B2 | 2/2013 | Fairbourn |
| 8,715,424 | B2 | 5/2014 | Prasad et al. |
| 8,808,796 | B1 | 8/2014 | Nichols et al. |
| 8,881,395 | B2 | 11/2014 | Dessoly et al. |
| 2003/0005995 | A1* | 1/2003 | Miller ...................... B60S 5/00 156/98 |
| 2010/0080914 | A1 | 4/2010 | Forrest et al. |
| 2010/0189957 | A1 | 7/2010 | Naritomi et al. |
| 2015/0174610 | A1 | 6/2015 | Verrier |
| 2016/0024605 | A1 | 1/2016 | Sikora et al. |
| 2016/0068197 | A1* | 3/2016 | Kane ...................... B62D 24/02 296/191 |
| 2016/0229457 | A1* | 8/2016 | Boettcher .............. B62D 25/04 |
| 2016/0332256 | A1 | 11/2016 | Gu |
| 2016/0368094 | A1 | 12/2016 | Breuer et al. |
| 2017/0044674 | A1 | 2/2017 | Seong |

FOREIGN PATENT DOCUMENTS

| | | |
|---|---|---|
| JP | 2012144213 A * | 8/2012 |
| WO | WO1990011163 A2 | 10/1990 |
| WO | WO2015082993 A1 | 6/2015 |

OTHER PUBLICATIONS

Wieczorek A., Graul M., Dilger K. (2017) Bonding Strength of Hot-Formed Steel with an AlSi Coating and Approaches to Improve It by Laser Surface Engineering. In: Silva L. (eds) Materials Design and Applications. Advanced Structured Materials, vol. 65. Springer, Cham.

* cited by examiner

MULTI-MATERIAL ASSEMBLY AND METHODS OF MAKING THEREOF

BACKGROUND

In recent years, high strength steels, particularly manganese-boron steels have been developed, which achieve high strengths when hot formed with rapid cooling. Current mass production structural design for vehicles is dominated by such stamped metal, which uses section size, material gauge and grade, and typically spot welding to achieve performance requirements. To facilitate fuel economy improvement, supported by weight reduction, new concepts are needed to deliver fundamental weight reduction at a reasonable value.

SUMMARY

In accordance with one embodiment, a method of making a multi-material assembly is provided. The multi-material assembly may be a vehicle frame structural member assembly. The method includes providing an elongated frame member including a first leg and a second leg. The elongated frame member comprises a coated high strength steel stamping. The coating may comprise a metal, a metal alloy, or an e-coating. Optionally, the coating comprises an AlSi alloy. The first leg comprises a first uncoated portion that is free of the coating. The method further includes providing a reinforcement member including at least a first foot. The reinforcement member may comprise a material that is dissimilar from the elongated frame member. The method includes applying an adhesive to the first foot of the reinforcement member or the first uncoated portion of the first leg, positioning the reinforcement member between the first leg and the second leg with the first foot positioned opposite the first uncoated portion with the structural adhesive positioned therebetween, and curing the adhesive to secure the first foot to the first uncoated portion.

In accordance with one embodiment, a method of making a multi-material assembly is provided. The multi-material assembly may be a vehicle frame structural member assembly. The method includes providing a coated high strength steel blank. The coating may comprise a metal, a metal alloy, or an e-coating. Optionally, the coating comprises an AlSi alloy. In addition, the method includes hot-stamping the high strength steel blank to form an elongated frame member including a first leg and a second leg, treating an interior surface of the first leg of the elongated frame member to form at least a first uncoated portion that is free of the coating, providing a reinforcement member including at least a first foot, the reinforcement member may comprise a material that is dissimilar from the elongated frame member, applying an adhesive to the first foot of the reinforcement member or the first uncoated portion of the first leg, and positioning the reinforcement member between the first leg and the second leg with the first foot positioned opposite the first uncoated portion with the adhesive positioned therebetween. In addition, the method includes positioning an inner frame member opposite the elongated frame member to define a chamber therebetween. The reinforcement member is positioned in the chamber with a first mating flange of the inner member positioned opposite a first mating flange of the elongated frame member that is positioned on the second end of the first leg outward from the first uncoated portion, and a second mating flange of the inner member positioned opposite a second mating flange of the elongated frame member. In addition, the method includes welding the first mating flange of the inner member to the first mating flange of the elongated frame member, welding the second mating flange of the inner member to the second mating flange of the elongated frame member to form a welded assembly, e-coating the welded assembly, and heating the welded assembly to cure the adhesive to secure the first foot to the first uncoated portion.

In accordance with one embodiment, a multi-material assembly is provided. The multi-material assembly may be a vehicle frame structural member assembly. The assembly includes an elongated frame member including a first leg and a second leg, the elongated frame member comprises a coated high strength steel stamping. The coating may comprise a metal, a metal alloy, or an e-coating. Optionally, the coating comprises an AlSi alloy. The first leg includes a first portion free of the coating, and a reinforcement member is provided including at least a first foot. The reinforcement member may comprise a material that is dissimilar from the elongated frame member, and an adhesive positioned between the first foot and the first uncoated portion that bonds the reinforcement member to the elongated frame member.

In accordance with one embodiment, a method of making a multi-material assembly is provided. The multi-material assembly may be a vehicle frame structural member assembly. The method includes providing a first structural component comprising a coating, wherein the first structural component comprises a first uncoated portion, providing a second structural component optionally comprising a metal or a metal alloy, applying an adhesive to the first uncoated portion or the second structural component, positioning the first uncoated portion opposite the second structural component with the adhesive positioned therebetween, and curing the adhesive to secure the first structural component to the second structural component. Optionally, the first structural component comprises an aluminum alloy casting, the coating is an e-coating, and the second structural component comprises an aluminum alloy or steel, and wherein providing the first structural component comprises e-coating the aluminum alloy casting, and treating the e-coated aluminum alloy casting to form the first uncoated portion. Optionally, the first structural component comprises a perimeter, the coating comprises a metal, a metal alloy, or an e-coating, wherein the first uncoated portion is positioned inward of at least a portion of the perimeter, and wherein a second portion of the first structural component extending from the perimeter to the first uncoated portion is coated with the coating. Optionally, the first structural component comprises an elongated frame member including a first leg and a second leg, the elongated frame member comprises a high strength steel stamping, wherein the second structural component comprises a reinforcement member including at least a first foot having a width that is less than a width of the first uncoated portion, wherein the step of applying the adhesive comprises applying the adhesive to the first uncoated portion or the first foot, and the step of positioning the first uncoated portion opposite the second structural component with the adhesive positioned therebetween comprises positioning the entire width of the first foot opposite the first uncoated portion with the adhesive positioned therebetween.

DETAILED DESCRIPTION

It should be understood that the description and drawings herein are merely illustrative and that various modifications and changes can be made in the compositions, methods and structures disclosed without departing from the present disclosure.

In general, a multi-material assembly is provided comprising a first coated structural component, and a second structural component. The first coated structural component comprises a first uncoated portion, the second structural component is positioned opposite the first uncoated portion, and an adhesive is provided between the first uncoated portion and the second structural component to secure the first coated structural component to the second structural component. The multi-material assembly may be a vehicle frame structural member assembly. In a non-limiting example, the frame structural member and/or the structural components thereof may be a load-bearing and/or a load-transferring feature or element applied to a vehicle's frame. The coating includes, but is not limited to, a metal, a metal oxide, a metal alloy, an e-coating, and any combination thereof.

In an embodiment, a multi-material vehicle frame structural member assembly is provided comprising a stamped ultra-high strength steel component, such as a boron containing steel, and a method of making thereof is provided. Before hot stamping, blanks are cut from a roll of the ultra-high strength steel. To avoid issues such as surface oxidation, the ultra-high strength steel roll or blanks are pre-coated with a protective layer. Typically, the coating comprises an aluminum silicate (AlSi) layer. The blanks may be heated to allow the AlSi coating to bond to the underlying ultra-high strength steel. Without being limited to any particular theory, more consistent adhesive bonding between the stamped ultra-high strength steel component (hereinafter referred to as "the stamped component") and a reinforcement is achieved by the removal or absence of the coating between at least a portion of the stamped component and the reinforcement.

Figure 1:
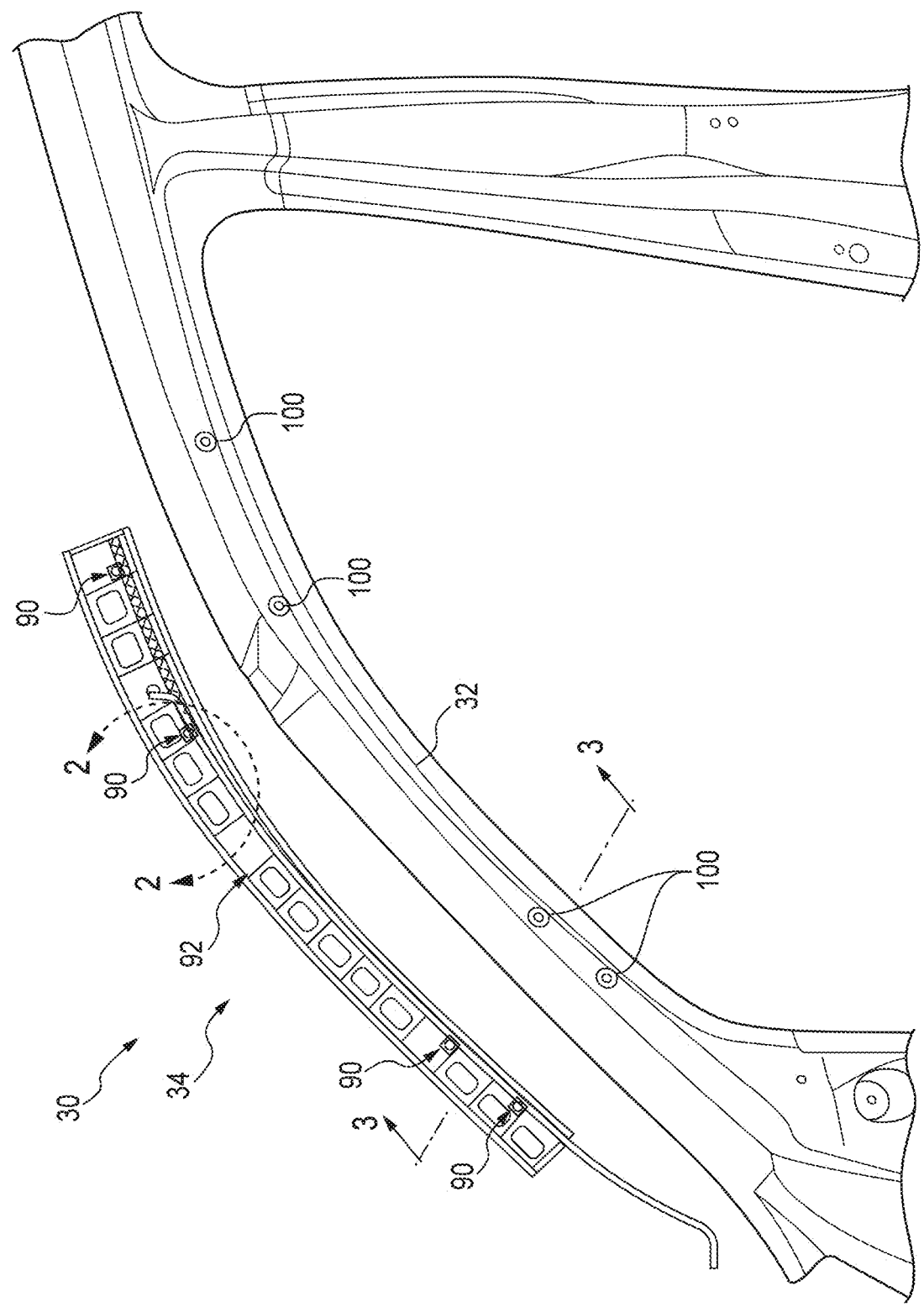
FIG. 1 is an exploded partial perspective view of a vehicle frame structural member assembly according to an exemplary embodiment of the present disclosure shown including an elongated frame member and a reinforcement member ready to be assembled onto the elongated frame member.
Figure 2:
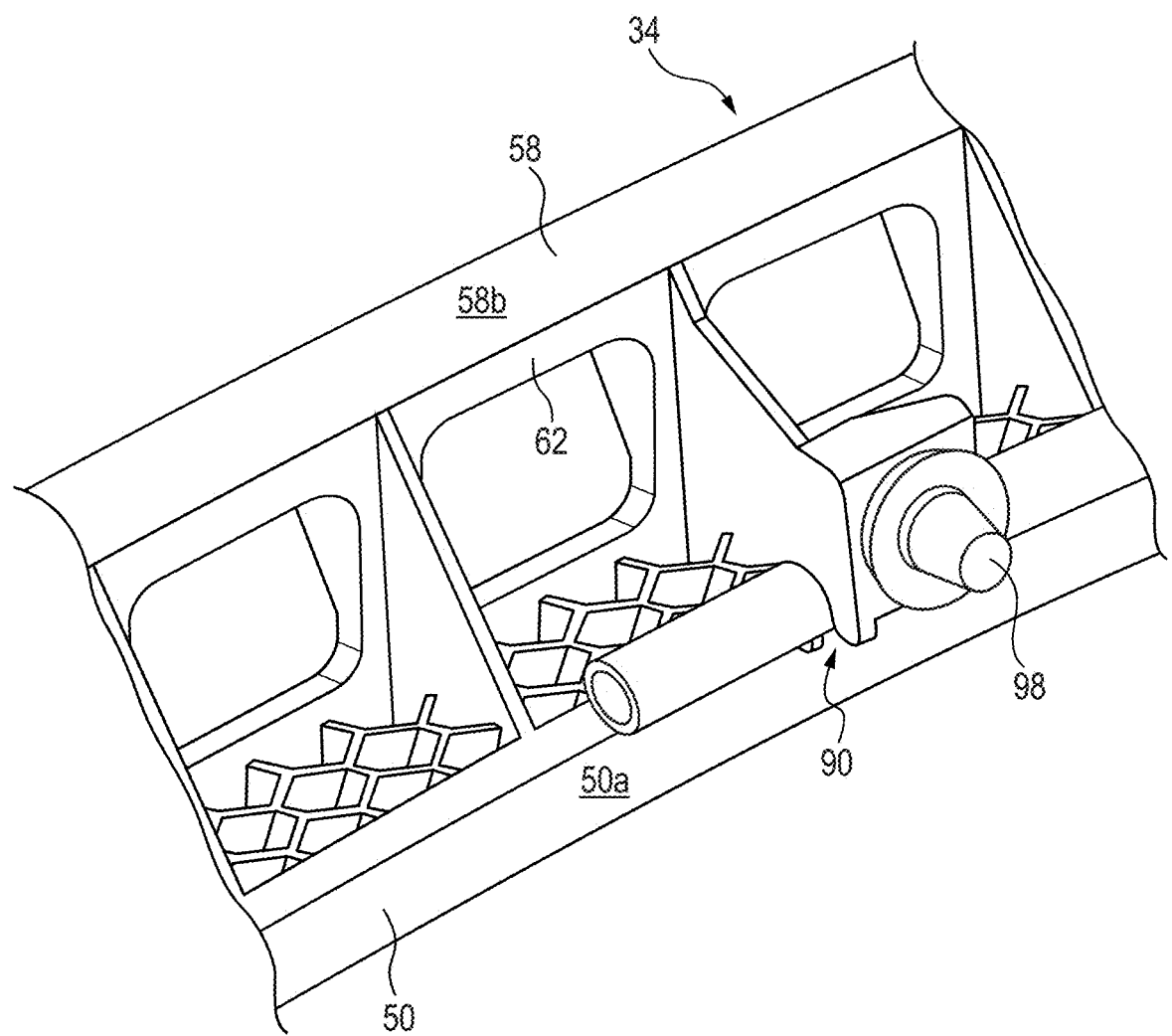
FIG. 2 is a partial enlarged view taken at the line 2-2 of FIG. 1 showing a view of a first foot and a second foot of the reinforcement member.
Figure 3:
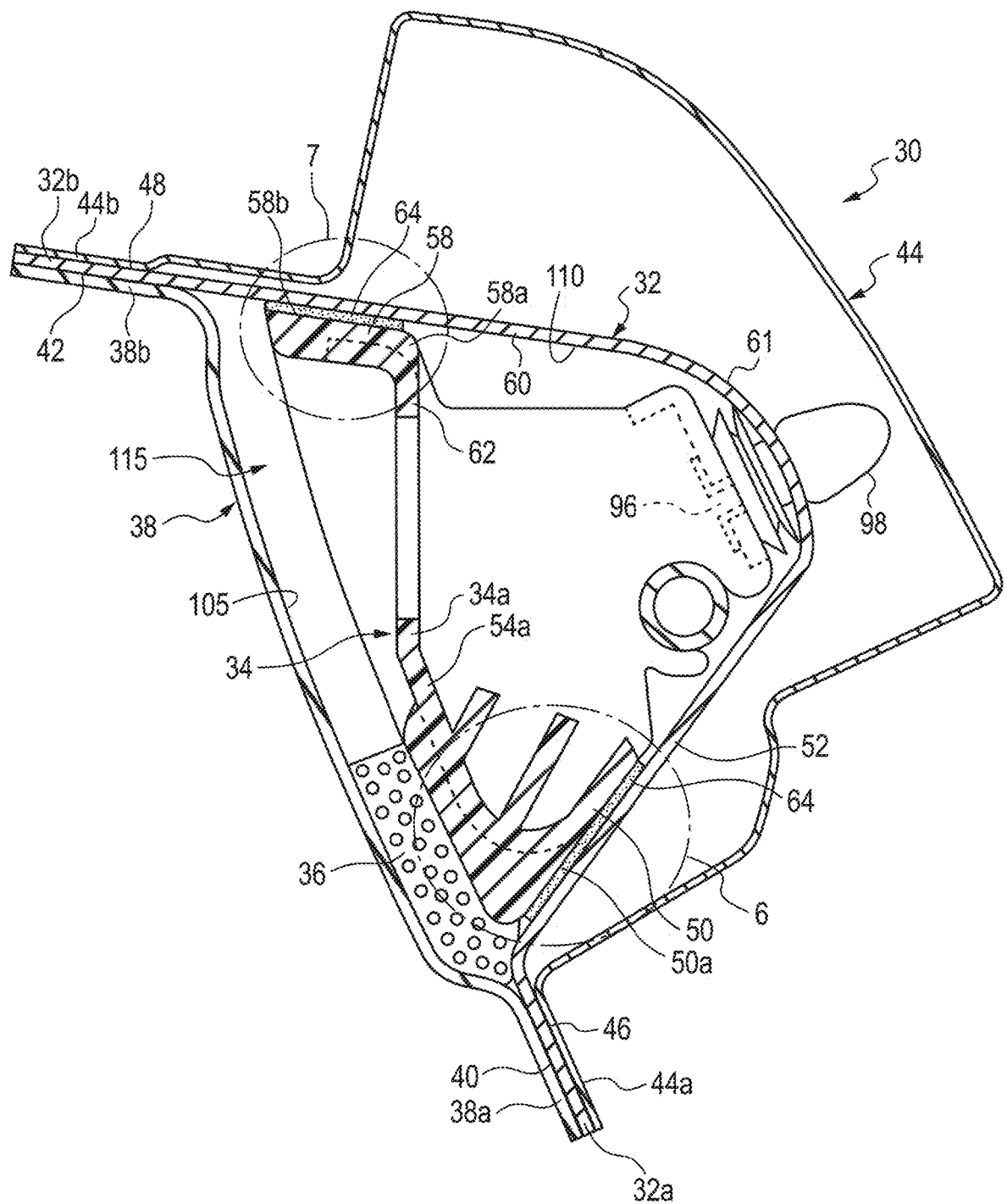
FIG. 3 is a cross-sectional view taken along the line 3-3 of FIG. 1 but shown in an assembled state with inner and outer frame members secured to the elongated frame member.

Referring now to FIGS. 1-16 wherein the showings are for purposes of illustrating one or more exemplary embodiments and not for purposes of limiting the same, a vehicle frame structural member assembly 30 (hereinafter referred to as "the assembly 30") according to an exemplary embodiment is provided. While, for purposes of simplicity of explanation, the methods have steps described as executing serially, it is to be understood and appreciated that the present disclosure is not limited by the illustrated order, and some steps could occur in different orders and/or concurrently with other steps from that shown and described herein. As shown in FIGS. 1-3, the assembly 30 includes an elongated frame member 32 (also referred to as a concave frame structure) and a reinforcement member 34 complementarily arranged adjacent the elongated frame member 32. In an embodiment, the assembly 30 includes the elongated frame member 32, the inner frame member 38, and the reinforcement member 34 disclosed in U.S. Patent Application Publication No. US2016/0229457, the contents of which are incorporated herein by reference. As shown, the elongated frame member 32 of the assembly 30 can be an A-pillar frame member with the reinforcement member 34 disposed along an upper or windshield portion of the A-pillar frame member (as best shown in FIG. 1). The elongated frame member 32 is formed via hot stamping of a high strength boron-containing steel having an aluminum silicate (AlSi) coating. An example of such a steel with an AlSi coating is commercially available under the designation Usibor® 1500 from ArcelorMittal. An illustrative example of a composition of Usibor® 1500P is summarized below in weight percentages (the rest is iron (Fe) and unavoidable impurities):

| C | Mn | Si | Ni | Cr | Cu | S | P | Al | V | Ti | B |
|---|---|---|---|---|---|---|---|---|---|---|---|
| 0.221 | 1.29 | 0.28 | 0.013 | 0.193 | 0.01 | 0.001 | 0.018 | 0.032 | 0.005 | 0.039 | 0.0038 |

The reinforcement member 34, which can also be referred to as an internal reinforcement, has an elongate body 34a that can be formed from a material that is dissimilar from the elongated frame member 32. In a non-limiting example, the reinforcement member 34 comprises a polymeric material, or a metal or metal alloy. In one embodiment, the reinforcement member 34 is formed from a fiber reinforced plastic including a plastic matrix material that encapsulates a fiber material. Polymeric materials include, but are not limited to, nylon, polyamide, polyester, polypropylene, polyethylene, or others. The polymeric material may be filled or unfilled. For example, the polymeric material may be filled with glass, carbon, or other reinforcement fibers. In another example, the matrix material can be nylon and/or the fiber material can be a plurality of glass fibers. As a more specific example, the matrix material can be nylon that is PA66 or better and/or the glass fibers can be provided in different lengths. In another specific example, the plastic component of the matrix material can be nylon PPA (polyphthalamide), nylon PA9T (poly 1,9-nonamethylene terephthalamide), or some other nylon having a relatively high glass transition temperature (Tg), such as relative to nylon PA66.

As shown in FIG. 3, the assembly 30 can include a structural foam 36 attached to the reinforcement member 34. The structural foam 36 can be a heat activated epoxy foam. The structural foam 36 can be overmolded onto the reinforcement member 34 to thereby attach the structural foam 36 to the reinforcement member 34. In one embodiment, the structural foam 36 is a heat activated epoxy foam that is initially overmolded onto the reinforcement member 34 and later heat activated to expand and bond the reinforcement member 34 to the inner frame member 38. For example, the structural foam 36 can be a heat-activated epoxy-based resin having foamable characteristics upon activation through the use of heat such as is received in an e-coat or other automotive/vehicle paint oven operation. In particular, as the structural foam 36 is heated, it expands, cross-links, and structurally bonds to adjacent surfaces. An example of a preferred formulation is an epoxy-based material that may include polymer modifiers such as an ethylene copolymer or terpolymer that is commercially available from L&L Products, Inc. of Romeo, Mich., under the designations that include L-5505, L-5510, L-5520, L-5540, L-5573 or combinations thereof. Such materials may exhibit properties including relatively high strength and stiffness, promote adhesion, rigidity, and impart other valuable physical and chemical characteristics and properties. In one exemplary embodiment, the structural foam is the commercially available material sold under the designation L-5520 by L&L Products, Inc., or an equivalent material. In another exemplary embodiment, the structural foam is the commercially available material sold under the designation L5505 by L&L Products, Inc., or an equivalent material.

As best shown in FIG. 3, assembly 30 can further include the inner frame member 38 having mating flanges 38a, 38b that mate with inner sides 40, 42 of mating flanges 32a, 32b of the elongated frame member 32 so that an interior surface 105 of the inner frame member 38 and an interior surface 110 of the elongated frame member 32 define a chamber 115 that houses the reinforcement member 34. The inner frame member 38 can be comprised of the same material and formed in the same manner as the elongated frame member 32. As shown in the illustrated embodiment, the structural foam 36 is interposed between the reinforcement member 34 and the inner frame member 38. The assembly 30 can additionally include an outer frame member 44 having mating flanges 44a, 44b that mate with outer sides 46, 48 of the mating flanges 32a, 32b of the elongated frame member 32 on an opposite side of the elongated frame member 32 relative to the mating flanges 38a, 38b of the inner frame member 38.

The reinforcement member 34 may include the body 34a, a first foot 50 and a second foot 58. A planar surface 50a of the first foot 50 mates against a lower section 52 of the elongated frame member 32. The lower section 52 and an upper section 60 of the elongated frame member 32 together extend from a body 61 of the elongated frame member 32 to form the elongated frame member 32 as a concave frame structure and are alternately referred to as first and second legs of the concave elongated frame member 32. The second foot 58 includes an upper wall 58b that mates against the upper section 60 of the elongated frame member 32 and an angled wall 62 extending downward from the upper wall 58b toward the first foot 50, and upward to an outer end 58a of the second foot 58. The upper wall 58b can be referred to as a shelf and is a planar surface that is positionable parallel to the upper section 60. As shown, an adhesive 64 can be interposed between the first foot 50 and the lower section 52 of the elongated frame member 32. Likewise, the adhesive 64 can be interposed between the second foot 58 and the upper section 60 of the elongated frame member 32.

The adhesive 64 can have one component or two components. Suitable two-component adhesives can be room temperature curing or precuring two-component epoxy resin adhesives or polyurethane adhesives or (meth)acrylate adhesives. Room temperature precuring two-component epoxy resin adhesives or polyurethane adhesives or (meth)acrylate adhesives can be epoxy resin adhesives or polyurethane adhesives or (meth)acrylate adhesives which consist of two components, the mixing of which causes a reaction between the components, thus achieving at least a certain degree of crosslinking ("precured" or "precrosslinked"). Such adhesives are capable, in a further curing step, of reacting further, for example at elevated temperature. These adhesives can have so-called precuring or pregelation in the first stage, and a heat-curing reaction stage at elevated temperature. Two-component epoxy resin adhesives can have a resin component comprising a glycidyl ether, a diglycidyl ether of bisphenol A and/or bisphenol F. In addition, they can have a hardener component comprising polyamines and/or polymercaptans. Such two-component epoxy resin adhesives can cure rapidly at room temperature after mixing of the two components, and are known to those skilled in the art. Two-component polyurethane adhesives can have polyisocyanates in one component, such as in the form of prepolymers having isocyanate groups, and polyols and/or polyamines in a second component. Such two-component polyurethane adhesives can cure rapidly at room temperature after mixing of the two components and are known to those skilled in the art. Two-component (meth)acrylate adhesives can have acrylic acid and/or methacrylic acid and/or esters thereof in one component. The second component can comprise a free-radical former, such as a peroxide. Such two-component (meth)acrylate adhesives cure rapidly at room temperature after mixing of the two components and are known to those skilled in the art.

As is known by those skilled in the art, room temperature curing two-component adhesives can also be cured under the influence of heat. This can lead to a more rapid reaction and thus to a shortening of the period of time until an adhesive bond produced therewith can be stressed with forces. Moreover, a heat treatment of such room temperature curing two-component adhesives can lead to higher strengths compared to those which do not undergo any such heat treatment.

In a non-limiting example, the adhesive 64 is a structural adhesive. Structural adhesives are adhesives used to bond structural parts of a structure together, such as for the assembly of the parts of a vehicle such as a car, a truck, a bus or a train. After curing, structural adhesives may bear both high static and high dynamic loads. The cured product of a structural adhesive has a lap shear strength of more than 18 MPa, optionally more than 21 MPa, and optionally more than 25 MPa.

In one exemplary embodiment, the adhesive 64 can also be a heat-curing one-component epoxy resin adhesive. An example heat-curing one-component epoxy resin adhesive can comprise at least one epoxy resin and at least one thermally activable catalyst or a hardener B for epoxy resins which is activated by elevated temperature. Heating of such a one-component heat-curing one-component epoxy resin adhesive causes crosslinking. The heating is effected typically at a temperature of more than 70° C. Exemplary adhesives of this type include those commercially available in the SikaPower® product line from Sika Automotive AG of Switzerland, including adhesives sold by Sika Automotive AG under the designation SikaPower® 961 and Sika-Power®968.

Figure 4:
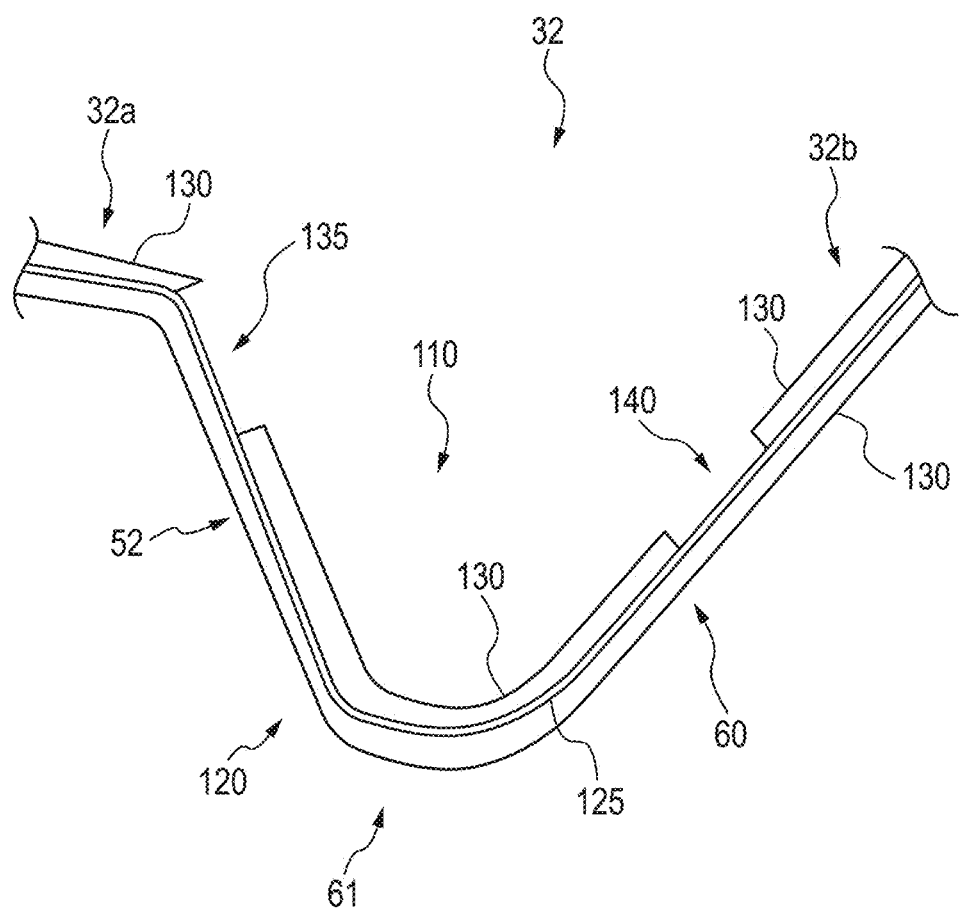
FIG. 4 is a schematic cross-sectional view of the elongated frame member including a first uncoated portion and a second uncoated portion according to one aspect of the present disclosure.
Figure 5A:
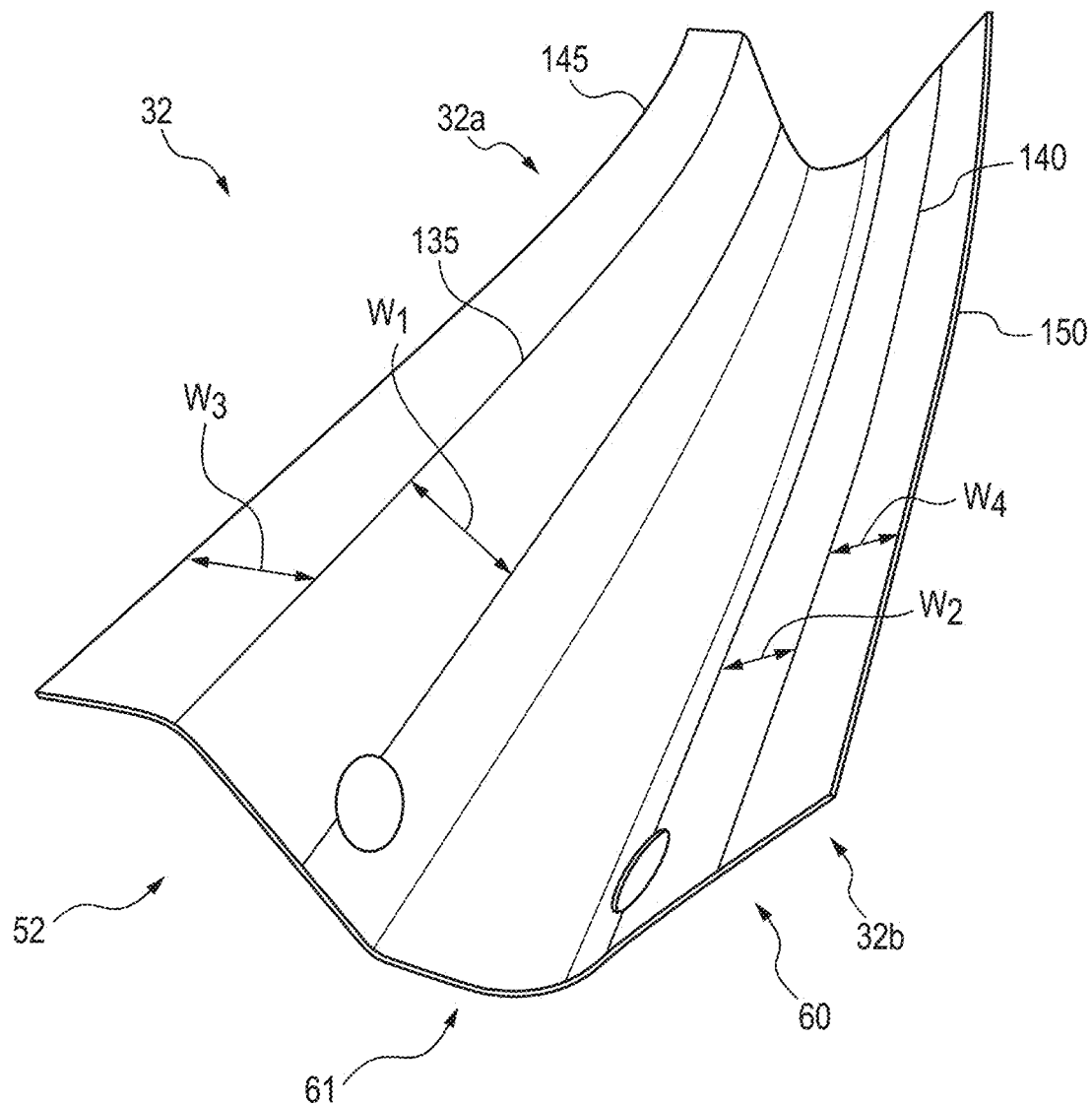
FIGS. 5A, 5B, and 5C are a perspective view of an interior surface of the elongated frame member including the first uncoated portion and the second uncoated portion according to aspects of the present disclosure.
Figure 5B:
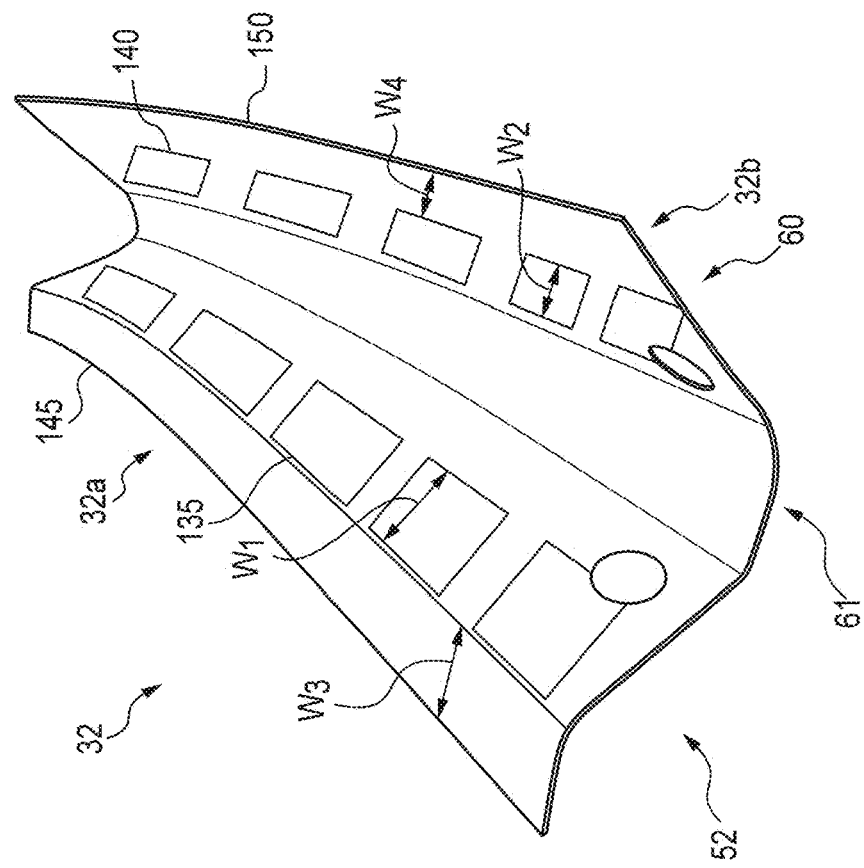
Figure 5C:
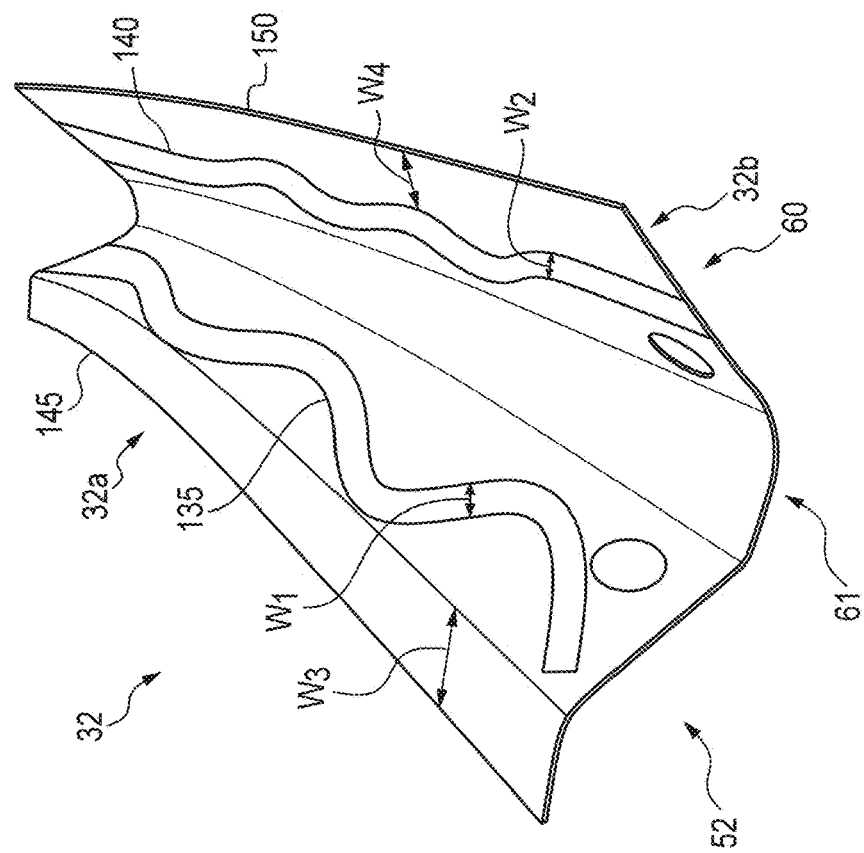

As shown in FIG. 4, the elongated frame member 32 comprises a high strength steel body 125 with an AlSi coating 130 on the interior surface 110 and an exterior surface 120 of the elongated frame member 32. The elongated frame member 32 is provided with a first uncoated portion 135 of the high strength steel body 125 and optionally at least a second uncoated portion 140 of the high strength steel body 125 that is either uncoated with the AlSi protective coating 130, or has had the AlSi coating 130 removed. Accordingly, the first uncoated portion 135 and the second uncoated portion 140 are recessed from the outer surface of the AlSi coating 130 to expose the high strength steel body 125 for adhesive bonding with the reinforcement member 34. In a non-limiting example, the first uncoated portion 135 and optionally the second uncoated portion 140 are recessed at least 25 microns from the outer surface of the AlSi coating 130. The surface of each of the first uncoated portion 135 and the second uncoated portion 140 extending between the raised surface of the AlSi coating 130 may be planar. As shown in FIG. 5A, the first uncoated portion 135 is positioned inwardly along the first leg 52 from an end 145 of the first leg 52 and the mating flange 32a, with the region of the high strength steel body 125 extending between the first uncoated portion 135 and the end 145 of the first leg 52 including the AlSi coating 130. Similarly, the second uncoated portion 140 is positioned inwardly along the second leg 60 from an end 150 of the second leg 60 and the mating flange 32b, with the region of the high strength steel body 125 extending between the second uncoated portion 140 and the end 150 of the second leg 60 including the AlSi coating 130. Accordingly, the end 145 of the first leg 52 and the end 150 of the second leg 60 at least partially define a perimeter of the elongated frame member 32, and the first uncoated portion 135 and the second uncoated portion 140 are positioned inward of at least a portion of the perimeter. Although the first uncoated portion 135 and the second uncoated portion 140 are shown in FIG. 5A as continuous elongated strips extending along the length of the elongated frame member 32, it is to be understood that the first uncoated portion 135 and the second uncoated portion 140 are not limited to such shapes or configurations. In an illustrative example, the first uncoated portion 135 and the second uncoated portion 140 may only extend a portion of the length of the elongated frame member 32. In another non-limiting example as shown in FIG. 5B, the first uncoated portion 135 and the second uncoated portion 140 may each comprise a plurality of discrete exposed portions or islands of the high strength steel body 125 with the AlSi coating 130 extending therebetween. In a non-limiting example as shown in FIG. 5C, the first uncoated portion 135 and the second uncoated portion 140 may be non-linear strips extending along all of or a portion of the length of the elongated frame member 32.

As best shown in FIG. 5A, the first uncoated portion 135 has a width $w_1$, the second uncoated portion 140 has a width $w_2$. The mating flange 32a has a width $w_3$ extending from the first uncoated portion 135 to the end 145 of the first leg 52, and the mating flange 32b has a width $w_4$ extending from the second uncoated portion 140 to the end 150 of the second leg 60. In a non-limiting example, the width $w_1$ is less than the width $w_3$, and the width $w_2$ is less than the width $w_4$. In an illustrative example, the width $w_1$ is from 22 mm to 26 mm, and the width $w_3$ is from 22 mm to 24 mm. In an illustrative example, the width $w_2$ is from 15 mm to 17 mm, and the width $w_4$ is greater than 22 mm.

Figure 6:
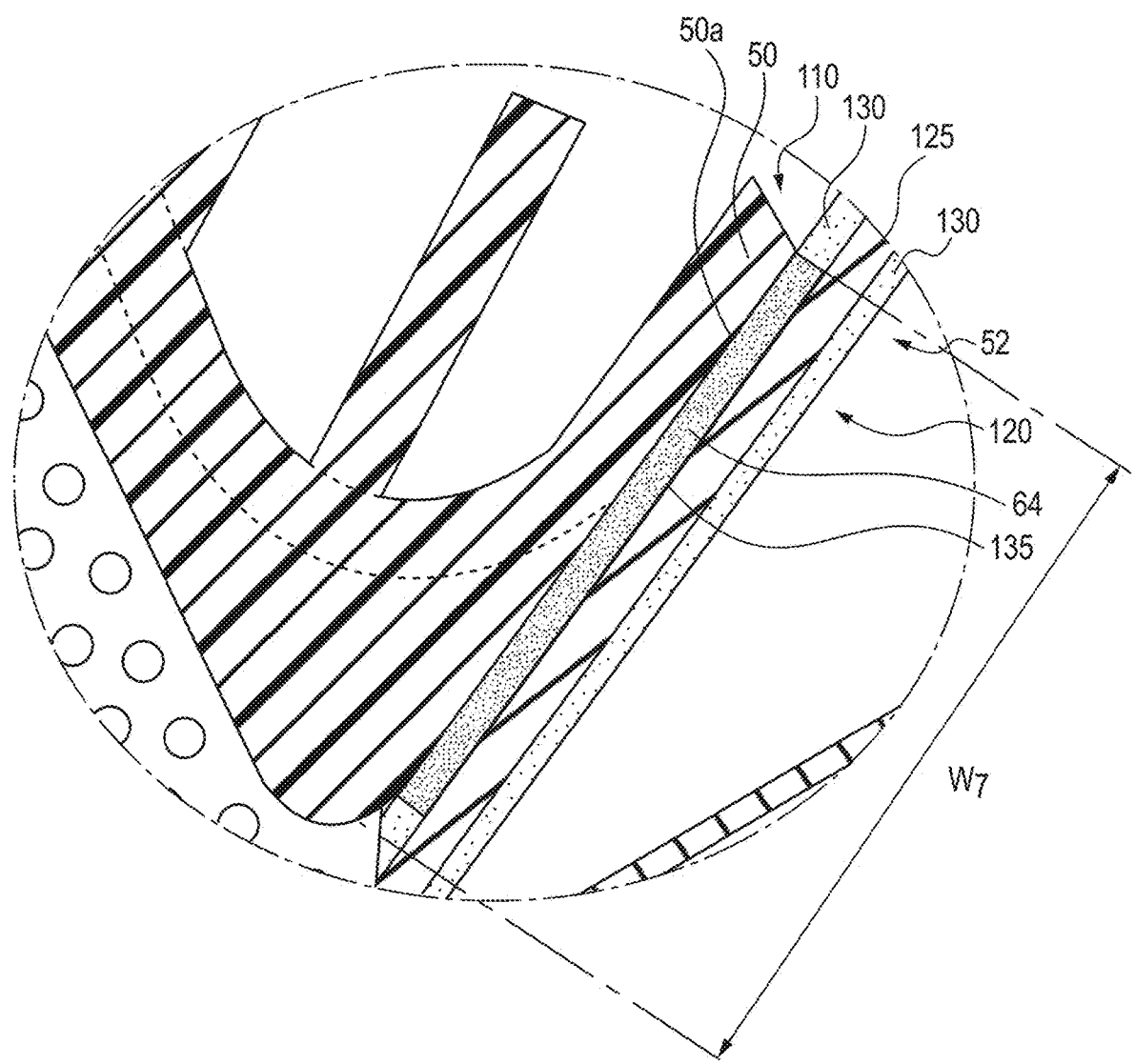
FIG. 6 includes portions of a view of FIG. 3 enlarged for magnification purposes.
Figure 7:
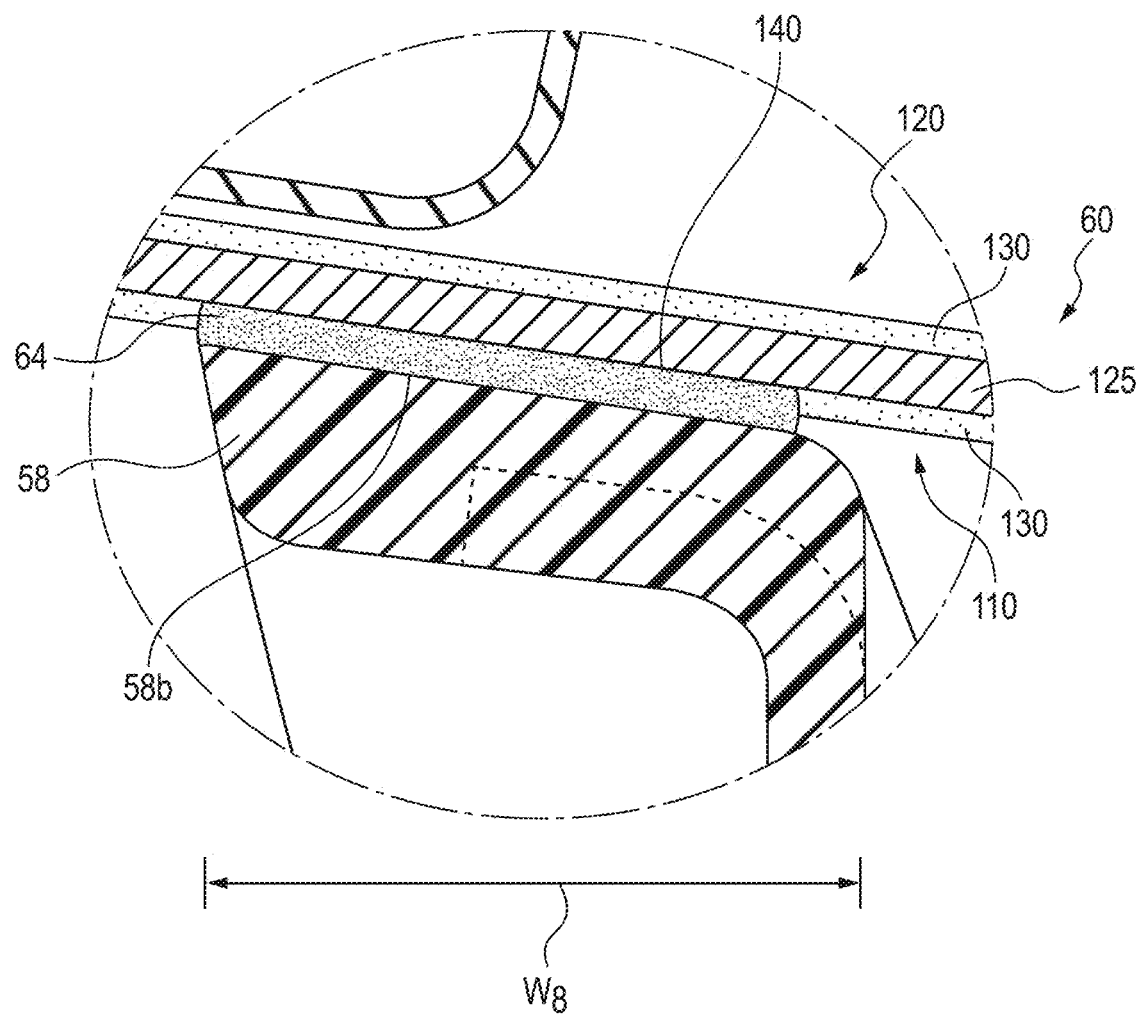
FIG. 7 includes portions of a view of FIG. 3 enlarged for magnification purposes.

As shown in FIG. 6, the adhesive 64 is positioned between the first foot 50 of the reinforcement member 34 and the first uncoated portion 135 of the high strength steel body 125 to bond the reinforcement member 34 to the elongated frame member 32. The first foot 50 has a width $w_7$ that extends along at least a portion of the width $w_1$ of the first uncoated portion 135. As shown in FIG. 7, the adhesive 64 is positioned between the second foot 58 of the reinforcement member 34 and the second uncoated portion 140 of the high strength steel body 125 to bond the reinforcement member 34 to the elongated frame member 32. The second foot 58 has a width $w_8$ that extends along at least a portion of the width $w_2$ of the second uncoated portion 140. It is to be understood that the adhesive 64 may be applied to extend along all or part of the length of each of the first foot 50 and the second foot 58. For example, the first foot 50 may extend along all or part of the length of the first uncoated portion 135 with the adhesive 64 positioned therebetween, and the second foot 58 may extend along all or part of the length of the second uncoated portion 140 with the adhesive 64 positioned therebetween.

Figure 8A:
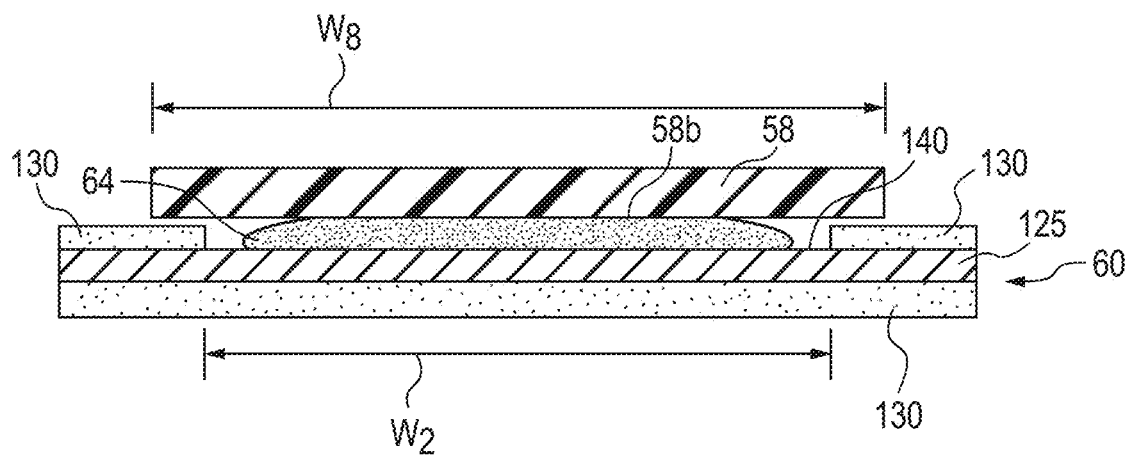
FIGS. 8A, 8B, and 8C are schematic cross-sectional views of the second foot of the reinforcement member bonded to the second uncoated portion of the elongated frame member with an adhesive according to aspects of the present disclosure.
Figure 8B:
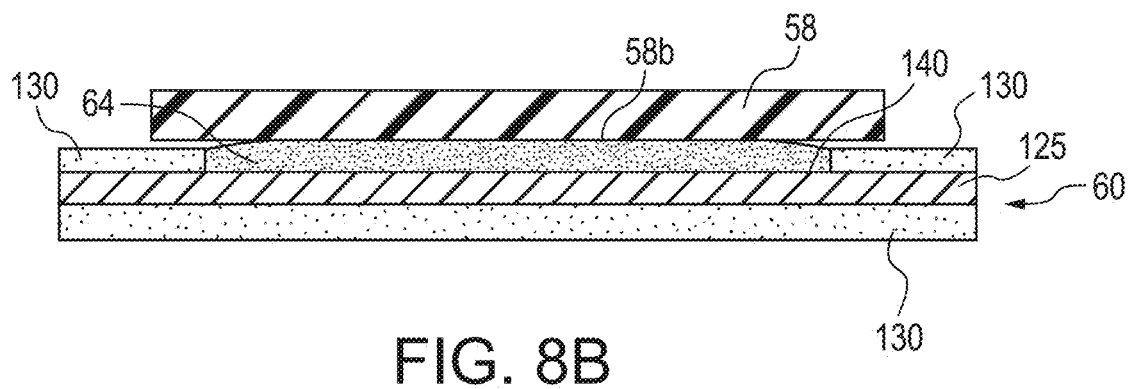
Figure 8C:
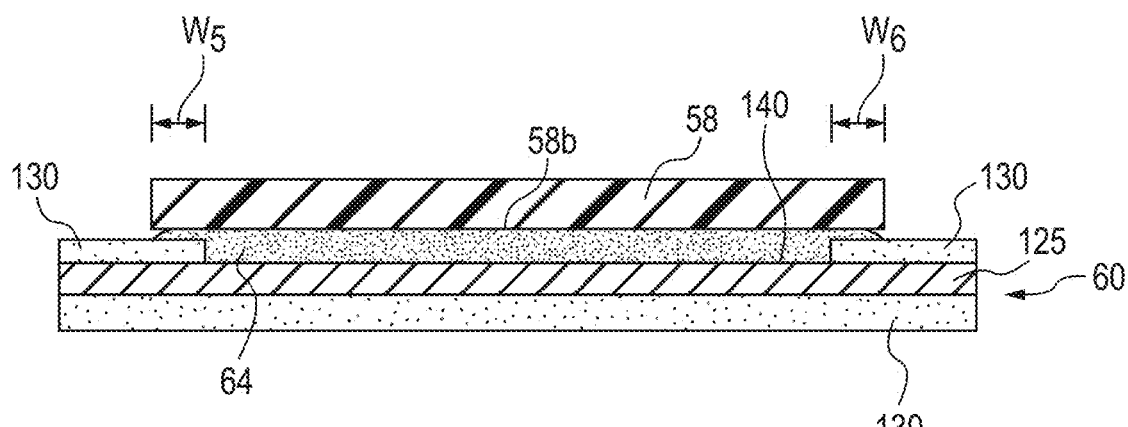

Although FIGS. 6 and 7 illustrate the adhesive 64 having a width extending over the entire width $w_1$ of the first uncoated portion 135 and the entire width $w_2$ of the second uncoated portion 140 of the high strength steel body 125, it is to be understood that the application of the adhesive 64 is not limited to such configurations. The adhesive 64 may be applied to have a width that spans only part of the width $w_2$ of the second uncoated portion 140 between the AlSi coating 130 positioned along each side thereof as shown in FIG. 8A, the adhesive 64 may be applied to have a width that spans across the entire width $w_2$ of the second uncoated portion 140 between the AlSi coating 130 positioned along each side thereof as shown in FIG. 8B, or the adhesive 64 may be applied to have a width that spans across the entire width $w_2$ of the second uncoated portion 140 between the AlSi coating 130 positioned along each side thereof and overlap the edges of the AlSi coating 130 positioned along each side thereof as shown in FIG. 8C. In a non-limiting example, at least 95% of the width of the adhesive 64 positioned between the second foot 58 and the second uncoated portion 140 is positioned within the width $w_2$ of the second uncoated portion 140. In a non-limiting example, the ratio of the combined overlap width ($w_5+w_6$) of the adhesive 64 to the width $w_2$ of the second uncoated portion 140 is less than 1:5, optionally less than 1:10, optionally less than 1:20, and optionally less than 1:25.

Figure 9:
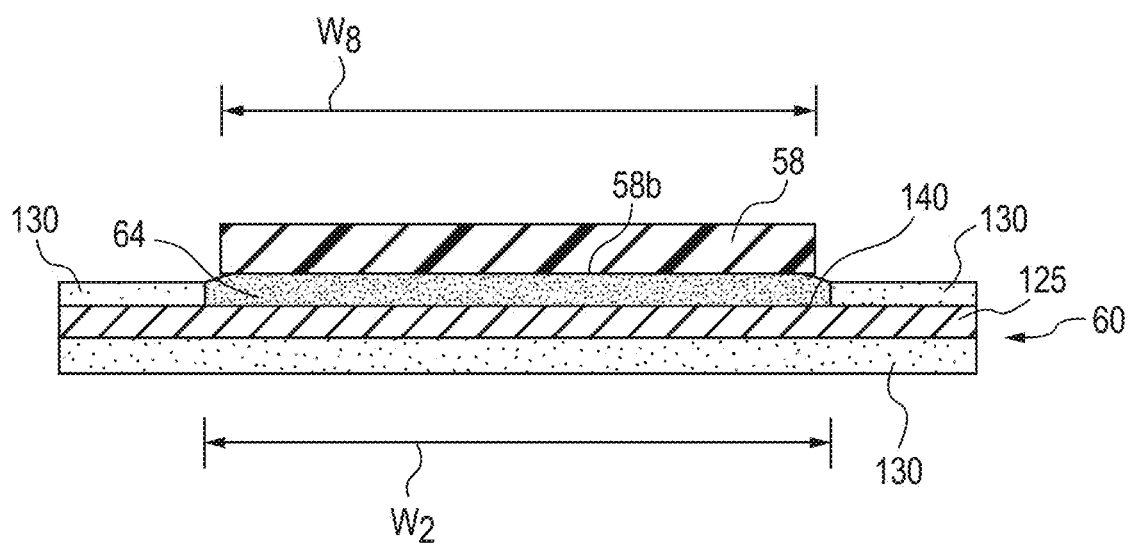
FIG. 9 is a schematic cross-sectional view of the second foot of the reinforcement member bonded to the second uncoated portion of the elongated frame member with an adhesive according to one aspect of the present disclosure.

Although the second foot 58 is shown in FIGS. 8A, 8B, and 8C as having a greater width $w_8$ than the width $w_2$ of the second uncoated portion 140, it is to be understood that the width $w_8$ of the second foot 58 may be the same as or less than the width $w_2$ of the second uncoated portion 140 as shown in FIG. 9. For example, when the width $w_8$ of the second foot 58 is less than the width $w_2$ of the second uncoated portion 140, the entire width $w_8$ of the second foot 58 may be positioned along the high strength steel body 125 within the width $w_2$ of the second uncoated portion 140. Therefore, the surface area of the upper wall 58b available for bonding to the elongated frame member 32 is positioned opposite the second uncoated portion 140 so that it may be entirely bonded with the adhesive 64 directly to the high strength steel body 125 without the AlSi coating 130 positioned therebetween.

Although the first foot 50 and the first uncoated portion 135 are not shown in FIGS. 8A, 8B, 8C, and 9, the same configurations may be applied. It is also to be understood that the first foot 50 and first uncoated portion 135 may have a different configuration with respect to the application of the adhesive 64 than the second foot 58 and the second uncoated portion 140. In a non-limiting example, the first foot 50 and the first uncoated portion 135 may have the adhesive 64 applied in the manner illustrated in FIG. 8A, and the second foot 58 and the second uncoated portion 140 may have the structural adhesive 64 applied in the manner illustrated in FIG. 8C.

It is to be understood that other methods may be used to secure the first foot 50 to the first uncoated portion 135 and the second foot 58 to the second uncoated portion 140 in addition to the adhesive 64. In a non-limiting example, mechanical fasteners including self-piercing rivets, nails, and flow drill screws, thermal fastening methods including spot welds, friction stir welds, friction stir spot welds, and combinations thereof may be used in addition to the adhesive 64.

Figure 10:
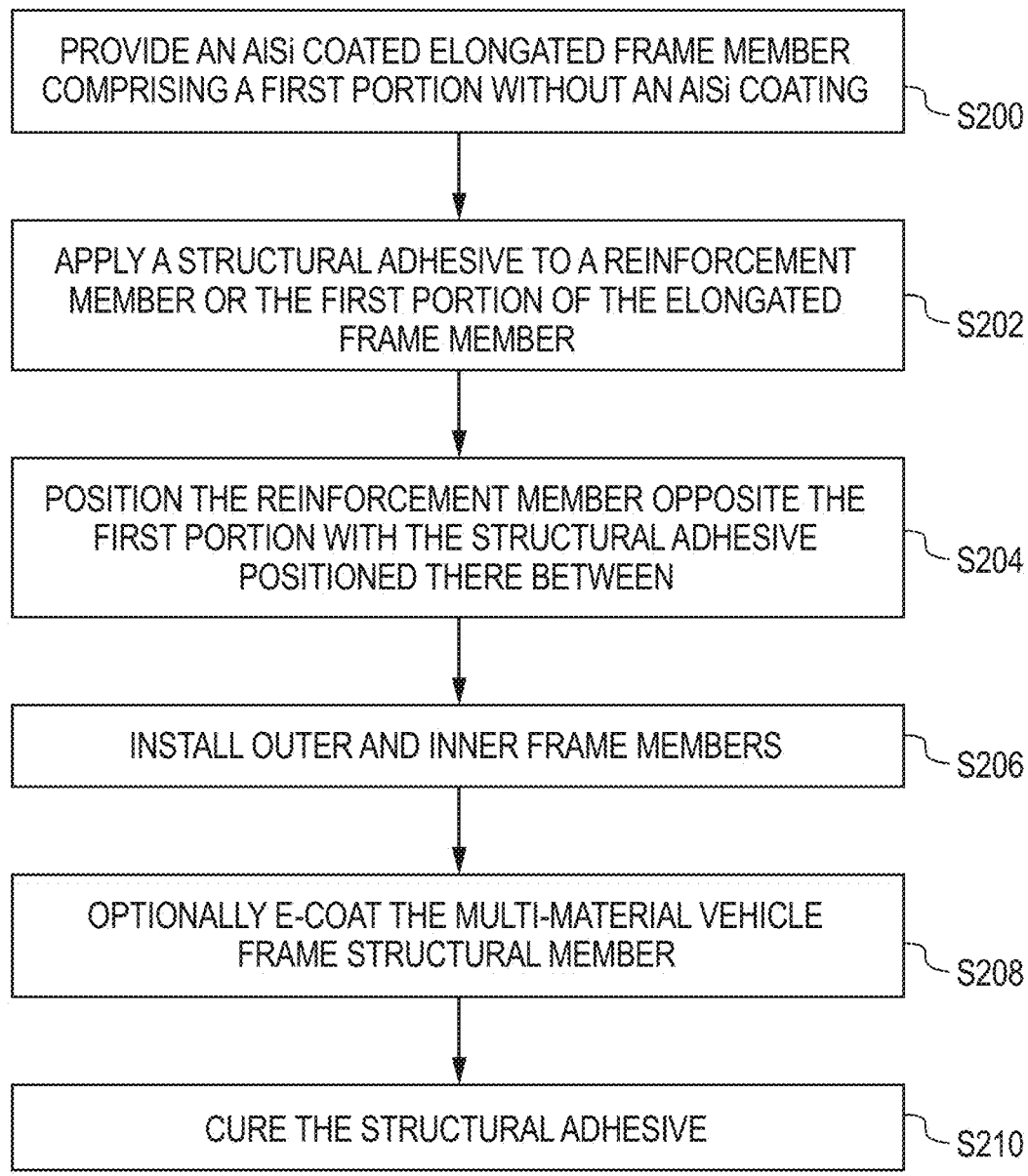
FIG. 10 is a process flow diagram illustrating a vehicle frame structural member assembly method according to an exemplary embodiment.

With reference now to FIGS. 10, 11, and 12A-12D, a vehicle frame structural member assembly method will now be described. In particular, the method can be used with the vehicle frame structural member assembly 30 described hereinabove and will be described with reference thereto, though this is not required and other vehicle frame structural member assemblies can be used. In the method of FIG. 10, at S200, an elongated frame member 32 is provided that includes the high strength steel body 125 with an AlSi coating 130 applied to an interior surface 110 and an exterior surface 120. The interior surface 110 of the elongated frame member 32 includes a first uncoated portion 135 and optionally a second uncoated portion 140 of the high strength steel body 125. The present disclosure is not limited in any way with respect to the formation of the first uncoated portion 135 and the second uncoated portion 140.

Figure 11:
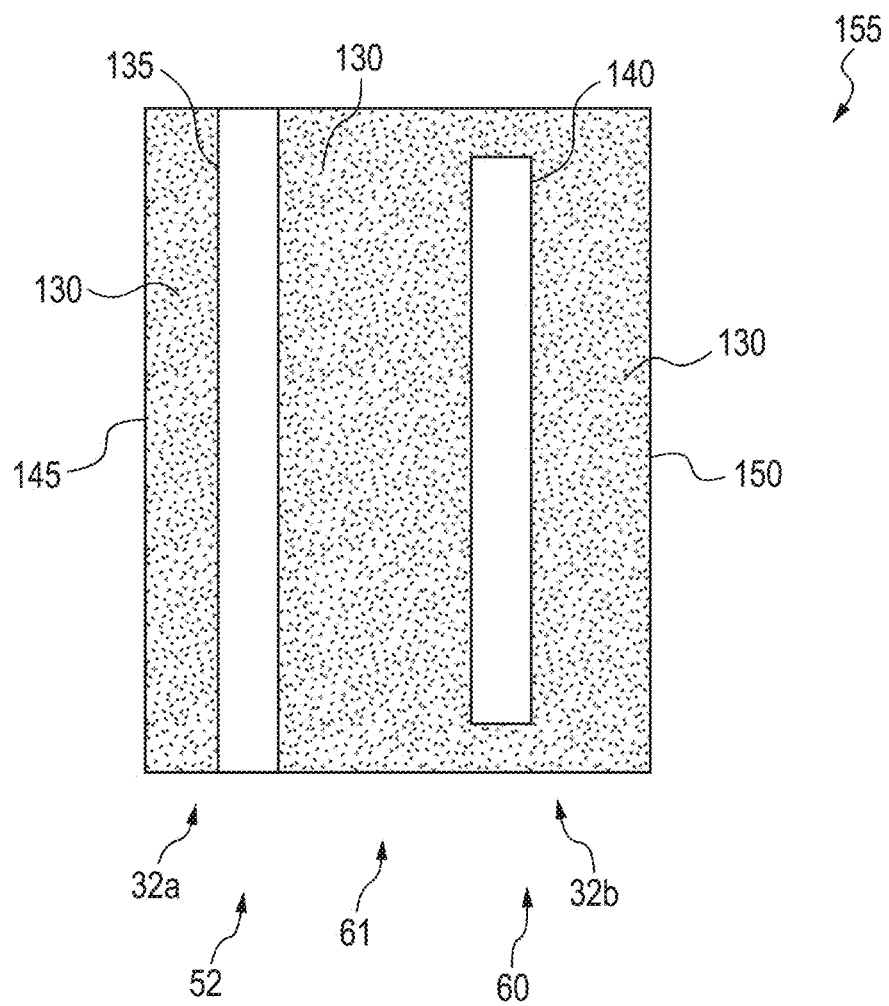
FIG. 11 is a schematic view of a blank prior to hot-stamping to form the elongated frame member including the first uncoated portion and the second uncoated portion according to one aspect of the present disclosure.

In a non-limiting example as shown in FIG. 11, a high strength steel blank 155 may be provided with the AlSi coating 130. The AlSi coating 130 may be applied to the high strength steel blank 155 in a manner that does not coat the first uncoated portion 135 and the second uncoated portion 140. Alternatively, the blank 155 may be coated with the AlSi coating 130, and the blank 155 may be treated chemically or mechanically to remove portions of the coating 130 to form the first uncoated portion 135 and the second uncoated portion 140. Illustrative examples of mechanical removal include grinding with, for example, wire wheels, and abrasive blasting with any suitable abrasive material such as shot blasting with metal shot, sand blasting, and glass bead blasting. The blank 155 may then be transferred to a hot stamping operation where the elongated frame member 32, as best shown in FIG. 5A, is formed. Alternatively, the blank 155 may be coated with the AlSi coating 130 and transferred to a hot stamping operation to form the elongated frame member 32. The elongated frame member 32 may then be treated to remove some of the AlSi coating 130 to form the first uncoated portion 135 and the second uncoated portion 140.

In a non-limiting example, the thickness of the AlSi coating 130 to be removed to form the first uncoated portion 135 and the second uncoated portion 140 is greater than 20 microns. In a non-limiting example, the thickness of the AlSi coating 130 is 30 microns, and 30 microns of the AlSi coating is removed to form the first uncoated portion 135 and the second uncoated portion 140. It is to be understood that not all of the AlSi coating 130 might not be removed to form the first uncoated portion 135 and the second uncoated portion 140, as some residual AlSi coating 130 or other impurities may remain bonded to the underlying high strength steel body 125. In a non-limiting example, the first leg 52 is treated to remove at least 25 microns of the AlSi coating 130 to form the first uncoated portion 135.

Figure 12A:
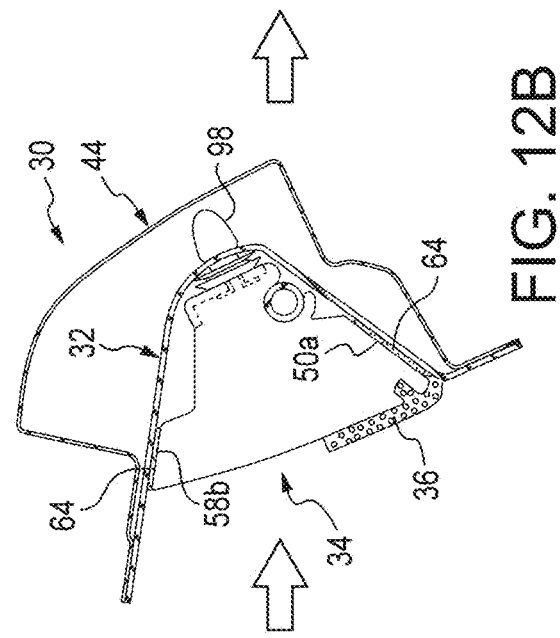
FIGS. 12A-D are cross-sectional views schematically showing a manufacturing process wherein the reinforcement member is complementarily positioned adjacent the elongated frame member and secured thereto according to one aspect of the present disclosure.
Figure 12B:
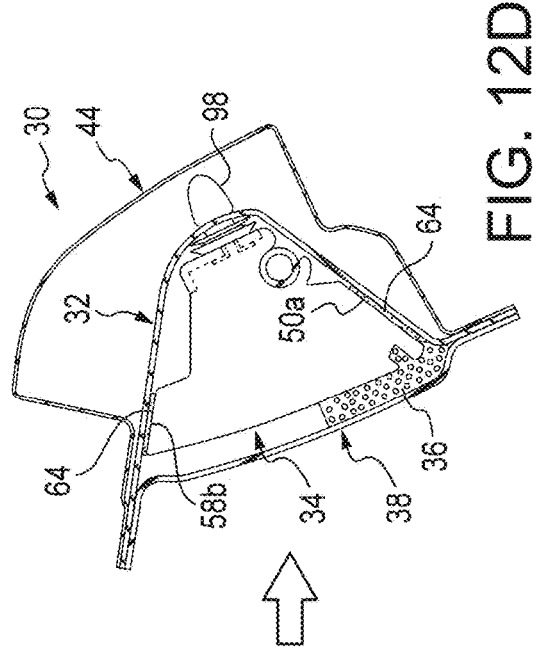

Next, at S202, the adhesive 64 is applied to one or both of the reinforcement member 34 and the first uncoated portion 135. For example, the adhesive 64 may be applied to the surface 50a of the first foot 50 and the upper wall 58b of the second foot 58. The adhesive 64 may be applied to the first uncoated portion 135 and the second uncoated portion 140 as shown in FIG. 12A, or the structural adhesive may be applied to each of the surface 50a, the upper wall 58b, the first uncoated portion 135, and the second uncoated portion 140. Following application of the adhesive 64, at S204, the reinforcement member 34 is positioned adjacent the elongated frame member 32 to position the adhesive 64 between the first uncoated portion 135 and the first foot 50, and between the second uncoated portion 140 and the second foot 58. In addition or in the alternative, complementarily positioning the reinforcement member 34 in S204 can include temporarily securing the reinforcement member 34 to the elongated frame member 32 as shown in FIG. 12B. It is to be understood that the adhesive 64 can be applied as one or more beads. As shown in the illustrative example of FIG. 12A, beads 64 can be applied to the first uncoated portion 135 of the elongated frame member 32 and the bead 64 can be applied to the second uncoated portion 140 of the elongated frame member 32.

Alternatively or in addition, and as shown in FIG. 12B, temporarily securing the reinforcement member 34 to the elongated frame member 32 in S204 can include mechanically fastening the reinforcement member 34 to the elongated frame member 32. For example, this can be achieved by receipt of the attachment clips 98 in the apertures 100 of the elongated frame member 32. Notably, the attached structural foam 36 remains in the non-expanded state, as illustrated in FIGS. 12A and 12B.

Figure 12C:
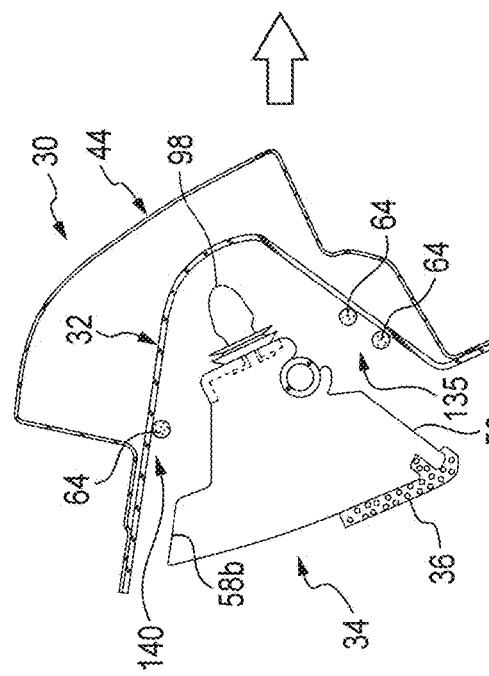

The method of FIG. 10 can additionally include installing the outer frame member 44 and installing the inner frame member 38 at S206. Installing the outer frame member 44 can be done by welding the mating flanges 44a, 44b of the outer frame member 44 to the outer sides 46, 48 of the mating flanges 32a, 32b of the elongated frame member 32. Installation of the inner frame member 38 can include welding mating flanges 38a, 38b of the inner frame member 38 to inner sides 40, 42 of the mating flanges 32a, 32b of the elongated frame member 32. FIG. 12C shows the inner frame member 38 installed and continues to show the structural foam 36 in the non-expanded state. Once the inner frame member 38 is installed to the elongated frame member 32 to form the chamber 115 with the reinforcement member 34 positioned therein, the structural foam 36 is disposed between the reinforcement member 34 and the inner frame member 38.

Next, as shown at S208 in FIG. 10, the assembly 30 can be coated with a corrosion prevention layer. The coating can be an epoxy-based coating. In one example, the coating can be applied to the assembly 30 by an electrodeposition coating process, also known as e-coating. In such example, e-coating can include any of a variety of suitable compositions and methods for e-coating, any of which can be used to apply the e-coating to the assembly 30. Generally, e-coating can include submerging the assembly 30 into an electrodeposition bath in an e-coating tank, which can include, a binder resin, a synthetic resin, and optionally, a pigment and other additives dissolved or dispersed in a solvent. In an example, an epoxy resin can be used, along with any of a variety of other suitable resins. Upon immersion into the e-coating tank, the assembly 30 can come into contact with electrodes such that a voltage can be applied between the cathode and an anode to provide current through the electrodeposition bath resulting in the application of the e-coating on the assembly 30. In one example, the assembly 30 can undergo electrodeposition one or more times, and in some embodiments, the assembly 30 can be washed between coatings, post-coating, or both. After the e-coating is formed, the e-coating can be cured by baking the assembly 30 in an oven. In certain examples, the oven can be heated to about 150° C. or greater; in other examples, the oven can be heated to about 180° C. or greater; and in other examples, the oven can be heated to about 195° C. or greater. It is to be understood that the structural foam 36 and the adhesive 64 may be cured before or after application of the e-coating. In an illustrative example, the structural foam 36 and the adhesive 64 are cured in the same oven step as the e-coating.

Figure 12D:
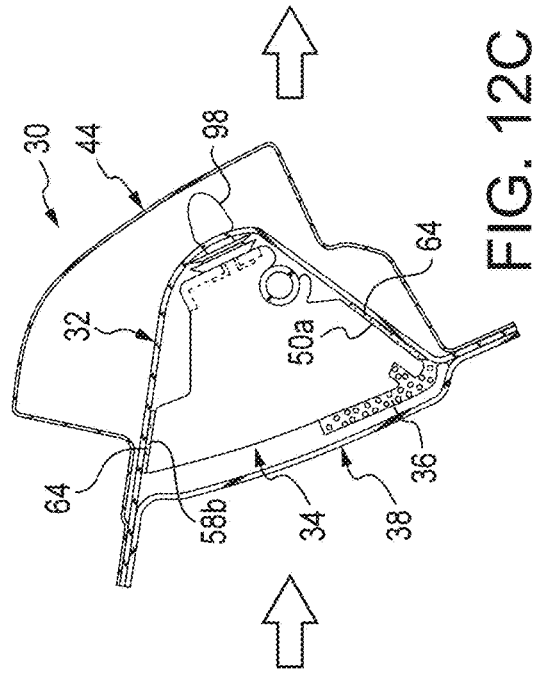

At Step S210, the structural foam 36 can be heated. As already described herein, the structural foam 36 can be heat activated epoxy foam that expands and bonds to components in which it is in contact. The heating of the structural foam in step S208 or S210 causes the structural foam 36 to fully fill the gap distance between the reinforcement member 34 and the inner frame member 38 as shown in FIG. 12D. In addition, as cured, the structural foam 36 bonds to the reinforcement member 34 and the inner frame member 38 thereby securing the reinforcement member 34 and the inner frame member 38 together. Heating of the structural foam in S208 or S210 can additionally include heating of the adhesive 64, which can have the effect of curing the adhesive 64. In one embodiment, the heating in S210 occurs during the paint oven process in which the vehicle or at least the vehicle frame has paint applied thereto that is then heated in a paint oven as is known and understood by those skilled in the art.

Although described herein with respect to an AlSi coated stamped ultra-high strength steel component and a reinforcement, the present disclosure is not limited to such. In an illustrative example, the first structural component is an e-coated aluminum casting, and the second structural component is an aluminum alloy or steel member. The first structural component includes a first uncoated portion. The uncoated portion may be provided by masking the aluminum casting during e-coating, or by treating the e-coated aluminum casting to remove a portion of the e-coating therefrom. The second structural component is positioned opposite the first uncoated portion and an adhesive is positioned therebetween. The resulting assembly can be e-coated and the adhesive cured to secure the first component to the second component. The multi-material assembly may be a vehicle frame structural member assembly.

In an illustrative example, one or both of a first structural component comprising a coated steel or aluminum alloy and a second structural member optionally comprising a steel or aluminum alloy may have a thickness that is too great for adequately securing the first structural component to the second structural component with mechanical or thermal fastening methods. The first structural component includes a first uncoated portion. The second structural component is positioned opposite the first uncoated portion and an adhesive is positioned therebetween to secure the first structural component to the second structural component. The multi-material assembly may be a vehicle frame structural member assembly.

EXAMPLES

The exemplifying embodiments that follow are intended to explain the present disclosure further, the selection of examples not being intended to represent any limitation of the scope of the subject matter of the present disclosure.

Elongated frame members 32 as shown in FIG. 5A were formed by hot-stamping. The elongated frame members 32 comprised a high strength steel commercially available under the designation Usibor® 1500 from ArcelorMittal and included a 30 micron AlSi coating.

Figure 13:
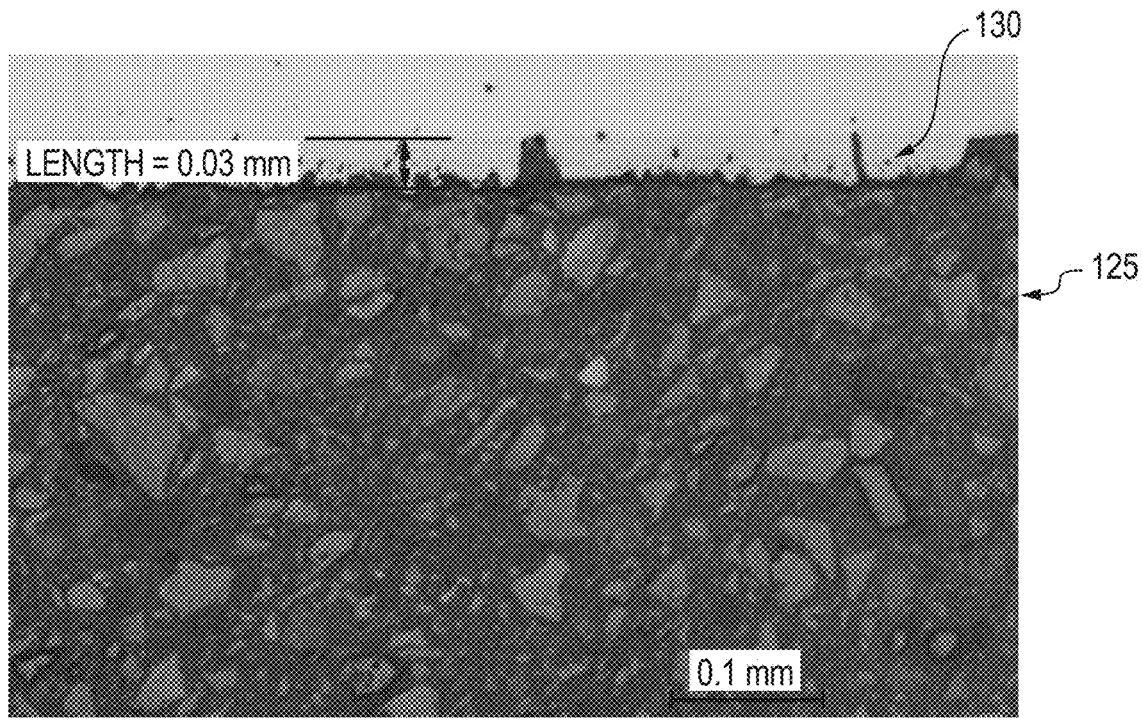
FIG. 13 is an SEM (scanning electron microscope) image showing a cross section of a comparative test coupon comprising a high strength steel body coated with AlSi.

Comparative samples 1-3 were prepared from elongated frame members 32 that did not undergo any treatment to remove the AlSi coating (see FIG. 13). Coupons of the AlSi coated high strength steel were bonded with a structural adhesive to a JAC980YL steel coupon (JAC980YL is a high-strength dual phase steel defined according to the Japan Iron and Steel Federation Standard) to form comparative samples 1-3 for cross-tension shear testing.

Figure 14:
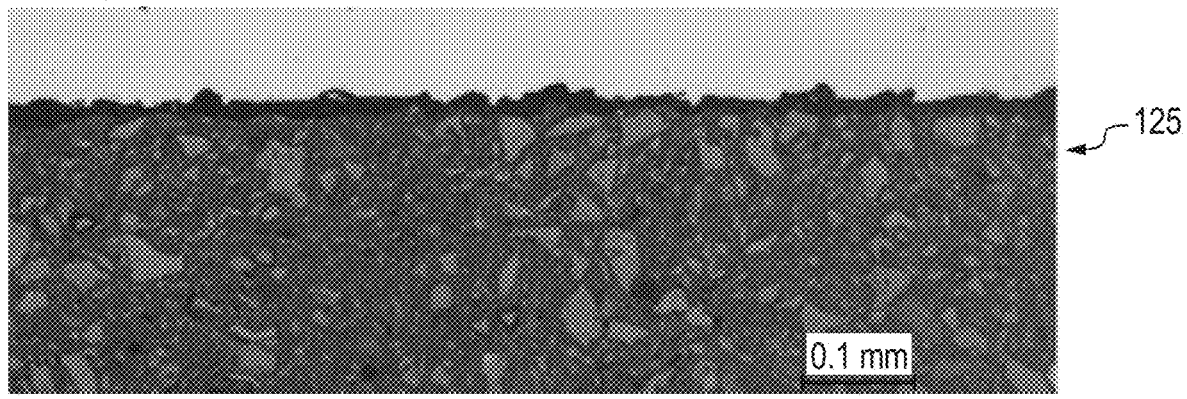
FIG. 14 is an SEM image showing a cross section of a test coupon comprising a high strength steel body coated with AlSi and treated according to one aspect of the present disclosure to form an uncoated portion.

Inventive samples 1-3 were prepared from elongated frame members 32 that underwent treatment in accordance with the present disclosure to remove AlSi coating to form the uncoated portion. In particular, inventive samples 1-3 were treated by sand blasting for 10 seconds (FIG. 14). Coupons of the AlSi coated high strength steel were bonded with a structural adhesive applied to the uncoated portion to a JAC980YL steel coupon to form inventive samples 1-3 for cross-tension shear testing.

Figure 15:
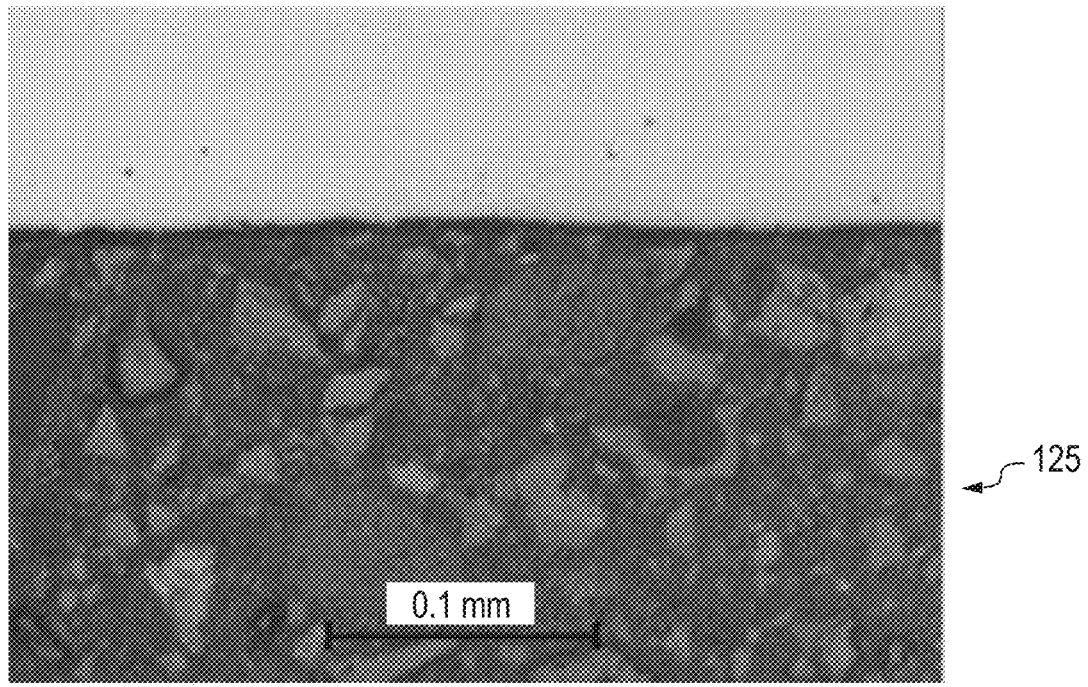
FIG. 15 is an SEM image showing a cross section of a test coupon comprising a high strength steel body coated with AlSi and treated according to one aspect of the present disclosure to form an uncoated portion.

Inventive samples 4-6 were prepared from elongated frame members that underwent treatment in accordance with the present disclosure to remove AlSi coating to form the uncoated portion. In particular, inventive samples 4-6 were treated by sand blasting for 30 seconds (FIG. 15). Coupons of the AlSi coated high strength steel were bonded with a structural adhesive applied to the uncoated portion to a JAC980YL steel coupon to form inventive samples 4-6 for cross-tension shear testing.

As shown in FIGS. 14 and 15, treatment of the elongated members 32 for at least 10 seconds was sufficient to remove the AlSi coating.

Figure 16:
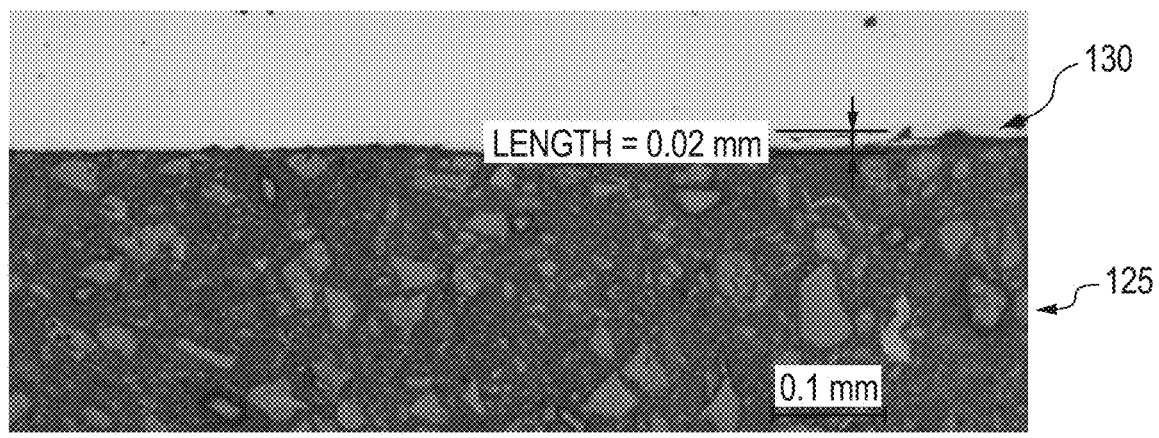
FIG. 16 is an SEM image showing a cross section of a test coupon comprising a high strength steel body coated with AlSi and treated according to one aspect of the present disclosure to form an uncoated portion.

In addition, elongated frame members 32 were treated in accordance with the present disclosure to mechanically remove the AlSi coating to form the uncoated portion with a wire wheel for 30 seconds (FIG. 16). Other elongated frame members 32 were treated in accordance with the present disclosure to mechanically remove the AlSi coating to form the uncoated portion with a wire wheel for 30 seconds followed by sand blasting for 10 seconds. Other elongated frame members 32 were treated in accordance with the present disclosure to mechanically remove the AlSi coating to form the uncoated portion with a wire wheel for 30 seconds and sand blasting for greater than or equal to one minute. Some of the samples treated with only the wire wheel for 30 seconds resulted in the removal of the AlSi coating. However, as shown in FIG. 16, some of the samples treated with only the wire wheel for 30 seconds resulted in partial removal of the AlSi coating 130. Treatment with the wire wheel and sand blasting resulted in the complete removal of the AlSi coating 130.

The results of some of the cross-tension shear testing are shown in Table 1.

TABLE 1

| | Treatment to Remove Al—Si Coating | Average Maximum Load (N) | Standard Deviation Maximum Load (N) | Cross-Tension Shear Testing Average Tensile Stress (MPa) | Standard Deviation Tensile Stress (MPa) |
|---|---|---|---|---|---|
| Comparative Samples | | | | | |
| 1 | None | 6547 | 883 | 434.7 | 58.2 |
| 2 | None | | | | |
| 3 | None | | | | |
| Inventive Samples | | | | | |
| 1 | 10 Second Sand Blast | 7624 | 682 | 501.3 | 43.1 |
| 2 | 10 Second Sand Blast | | | | |
| 3 | 10 Second Sand Blast | | | | |
| 4 | 30 Second Sand Blast | 7590 | 142 | 502.6 | 6.8 |
| 5 | 30 Second Sand Blast | | | | |
| 6 | 30 Second Sand Blast | | | | |

As shown in Table 1, cross-tension shear testing of comparative samples 1-3 (without any treatment to remove any of the coating) resulted in an average maximum load of 6547N with a standard deviation of 883N, and an average tensile stress of 434.7 MPa with a standard deviation of 58.2 MPa. Cross-tension shear testing of inventive samples 1-3 (with a 10 second sand blast treatment to remove a portion of the coating) resulted in an average maximum load of 7624N with a standard deviation of 682N, and an average tensile stress of 501.3 MPa with a standard deviation of 43.1 MPa. Cross-tension shear testing of inventive samples 4-6 (with a 30 second sand blast treatment to remove a portion of the coating) resulted in an average maximum load of 7590N with a standard deviation of 142N, and an average tensile stress of 502.6 MPa with a standard deviation of 6.8 MPa.

Although removal of the AlSi coating 130 in accordance with the present disclosure does not necessarily result in a substantial difference from the comparative samples with respect to the maximum load and tensile stress, the inventive samples of the present disclosure do exhibit a substantial improvement in the standard deviation of the maximum load and tensile stress. As the standard deviation is narrower, the components of the assembly 30 of the present disclosure can be designed to reduce weight of the assembly 30, as the parts do not have to be fabricated from a thicker or heavier grade of material to accommodate the worst case scenario (lowest maximum load and tensile strength). Performance repeatability is also improved.

Without being limited to any particular theory, sandblasting for more than 10 seconds further removes from the high strength steel body 125 at least some impurities or any ternary layer of alloy at the interface of the high strength steel body and the AlSi coating 130, further improving the consistency of bonding between the adhesive 64 and the high strength steel body 125.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of making a multi-material assembly comprising:
providing an elongated frame member having a length, the elongated frame member being formed by hot-stamping a steel blank coated with an AlSi alloy coating, wherein the elongated frame member includes a body, a first leg and a second leg, the first leg including a first end connected to the body and a second end extending outward from the body, wherein the first end and the second end extend along the length of the elongated frame member and the second end defines a portion of a perimeter of the elongated frame member;
treating an interior surface of the first leg to form a first uncoated portion that has a length that extends along the length of the elongated frame member and is positioned inward of the portion of the perimeter of the elongated frame member defined by the second end, wherein the first uncoated portion is positioned between the first end and the second end of the first leg, wherein the first leg extending from the first end to the first uncoated portion remains coated, and the first leg extending from the first uncoated portion to the second end remains coated;

providing a reinforcement member including at least a first foot, wherein the reinforcement member comprises a material that is dissimilar from the elongated frame member;

applying an adhesive to the first foot of the reinforcement member or the first uncoated portion of the first leg;

positioning the reinforcement member between the first leg and the second leg with the first foot positioned opposite the first uncoated portion with the adhesive positioned therebetween; and curing the adhesive to secure the first foot to the first uncoated portion.

2. The method of claim 1, further comprising:

treating the second leg to form a second uncoated portion; and applying a second adhesive to a second foot of the reinforcement member or the second uncoated portion, wherein positioning the reinforcement member between the first leg and the second leg includes positioning the second foot opposite the second uncoated portion with the second adhesive positioned therebetween, and wherein a step of curing the second adhesive secures the second foot to the second uncoated portion.

3. The method of claim 1, wherein the first leg is treated to remove at least 25 microns of the AlSi alloy coating to form the first uncoated portion.

4. The method of claim 3, wherein the first uncoated portion is recessed from the AlSi alloy coating.

5. The method of claim 1, wherein the first foot comprises a width that is less than a width of the first uncoated portion, and wherein an entire width of the first foot is positioned opposite the first uncoated portion.

6. The method of claim 5, wherein the step of providing an elongated frame member comprises hot-stamping the steel blank to form the elongated frame member, and wherein the method further comprises:

positioning an inner frame member opposite the elongated frame member to define a chamber therebetween, wherein the reinforcement member is positioned in the chamber, wherein a first mating flange of the inner frame member is positioned opposite a first mating flange of the elongated frame member that is positioned on the second end of the first leg outward from the first uncoated portion, and a second mating flange of the inner frame member is positioned opposite a second mating flange of the elongated frame member;

welding the first mating flange of the inner frame member to the first mating flange of the elongated frame member, and welding the second mating flange of the inner frame member to the second mating flange of the elongated frame member to form a welded assembly;

e-coating the welded assembly; and heating the welded assembly to cure the adhesive to secure the first foot to the first uncoated portion.

7. The method of claim 5, wherein the cured adhesive positioned between the first foot and the first uncoated portion is positioned entirely within the width of the first uncoated portion.

8. The method of claim 1, wherein the first uncoated portion comprises a width and the adhesive positioned between the first foot and the first uncoated portion comprises a width, and at least 95% of the width of the adhesive positioned between the first foot and the first uncoated portion is positioned within the width of the first uncoated portion.

9. The method of claim 1, further comprising:

providing an inner frame member including a first mating flange and a second mating flange; and positioning the inner frame member opposite the elongated frame member to define a chamber therebetween, wherein the reinforcement member is positioned in the chamber, wherein the first mating flange of the inner frame member is positioned opposite a first mating flange of the elongated frame member that is positioned on the second end of the first leg outward from the first uncoated portion, and the second mating flange of the inner frame member is positioned opposite a second mating flange of the elongated frame member, wherein the step of positioning the inner frame member opposite the elongated frame member occurs after positioning the reinforcement member between the first leg and the second leg of the elongated frame member and before curing the adhesive.

\* \* \* \* \*